US006865483B1

United States Patent
Cook, III et al.

(10) Patent No.: US 6,865,483 B1
(45) Date of Patent: Mar. 8, 2005

(54) METHODS AND APPARATUS FOR PROVIDING A TOPOLOGY VIEW BASED ON HEURISTIC INFORMATION DENSITY

(75) Inventors: William Andrew Cook, III, Raleigh, NC (US); Stephen Merrell Diering, Raleigh, NC (US); Joseph Eric Firebaugh, Apex, NC (US); Robert Charles Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/698,240

(22) Filed: Oct. 31, 2003

(51) Int. Cl.[7] .............................................. G01C 21/30
(52) U.S. Cl. ..................... 701/211; 701/25; 701/206; 701/212; 340/995.14
(58) Field of Search ............................ 701/23–25, 36, 701/201, 206, 211, 212, 214; 340/988, 995.14, 995.19, 995.23

(56) References Cited

U.S. PATENT DOCUMENTS

| | | | | | |
|---|---|---|---|---|---|
| 5,521,826 | A | * | 5/1996 | Matsumoto | 701/208 |
| 5,864,337 | A | * | 1/1999 | Marvin | 345/708 |
| 6,477,526 | B2 | * | 11/2002 | Hayashi et al. | 707/4 |
| 2002/0091758 | A1 | * | 7/2002 | Singh et al. | 709/203 |
| 2003/0220735 | A1 | * | 11/2003 | Nimura | 701/208 |

* cited by examiner

Primary Examiner—Gertrude A. Jeanglaude
(74) Attorney, Agent, or Firm—Joseph B. Agusta; David R. Irvin (57) ABSTRACT

A technique is provided to display a view perspective of an electronic map containing a number of viewable points of interest about a point of reference. The technique assigns a weighted importance value to each point of interest. Before displaying the view perspective of the requested map, the weighted importance value of each point of interest is summed and compared against a target value. If the summed weight substantially equals the predefined, the corresponding viewable points of interest are displayed in the view perspective.

24 Claims, 7 Drawing Sheets

METHODS AND APPARATUS FOR PROVIDING A TOPOLOGY VIEW BASED ON HEURISTIC INFORMATION DENSITY

FIELD OF THE INVENTION

The present invention relates generally to improved systems and methods for presenting an electronic map, and, more particularly, to advantageous techniques for providing a view of a requested map at a zoom perspective based on a weighting factor assigned to points of interest within the map.

BACKGROUND OF THE INVENTION

Many graphical user interfaces such as network topology viewers or geographical map viewers contain lots of information that can be seen at different detail levels. Typically, when a user retrieves and displays an electronic map or network layout, the initial starting view of the map rarely matches the needs of the user. Most of these viewers contain features that allow a user to zoom, pan, or adjust detail level of what points of interest to display thereby providing the user the ability to adjust the information to a level that is understandable. In order for a displayed map to display a map containing an amount of information manageable by a user, the user has to determine whether to zoom in for more detail or zoom out for a more global perspective. Although the user has access to features for tailoring the perspective of the displayed view, the user spends needless time and effort to do so.

Clearly, it would be highly desirable if users were able to display an initial view perspective of electronic maps, network layouts, and the like which matched more closely the amount of information those users were capable of readily processing.

SUMMARY OF THE INVENTION

Humans can typically only understand a finite range of information and struggle with getting too much or too little information. Among its several aspects, the present invention advantageously assigns a weighted importance factor to points of interest which would be viewable in an electronic map, network topology, or the like. Before displaying a view perspective of a requested map, the present invention sums the weighting factors of the viewable points of interest surrounding a point of reference. If the summed weighting factors substantially equal a predefined target weight, the corresponding viewable points of interest are then displayed in the view perspective.

A more complete understanding of the present invention, as well as further features and advantages of the invention, will be apparent from the following Detailed Description and the accompanying drawings.

DETAILED DESCRIPTION

Figure 1:
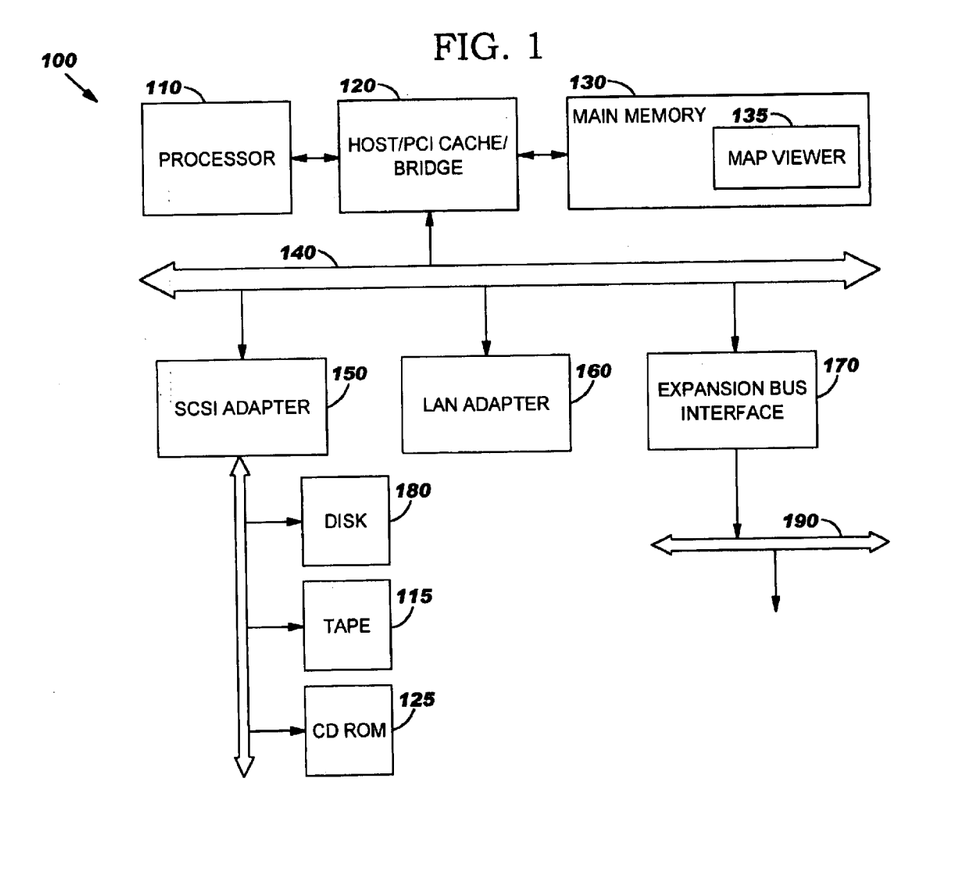
FIG. 1 shows a block diagram of an exemplary computer system in which the present invention may be suitably implemented.

FIG. 1 shows a block diagram illustrating a computer in which the present invention may be suitably implemented. A computer 100 may suitably be a handheld computer, a notebook, a server or any other processor based machine used to display an electronic map, network topology, or the like. The computer 100 as illustrated employs a peripheral component interconnect (PCI) local bus architecture. Although a PCI bus is shown, other bus architectures such as Accelerated Graphics Port (AGP) and Industry Standard Architecture (ISA) may be used. A processor 110 and main memory 130 are connected to PCI local bus 140 through PCI bridge 120. PCI bridge 120 also may include an integrated memory controller and cache memory for processor 110. In the depicted example, a small computer system interface (SCSI) host bus adapter 150, a local area network (LAN) adapter 160, and an expansion bus interface 170 are connected to the PCI local bus 140 by direct component connection. Expansion bus interface 170 provides a connection to an expansion bus 190 for additional peripherals not shown. The SCSI host bus adapter 150 provides a connection for hard disk drive 180, a tape drive 115, and a CD-ROM drive 125. An operating system runs on processor 110 and is used to coordinate and provide control of various components within the computer 100. The operating system may be a commercially available operating system, such as AIX®, LINUX®, Windows®, Windows® CE 3.0, or the like. An object oriented programming system such as Java™, Object Oriented Perl, or Visual Basic may run in conjunction with the operating system and provide calls to the operating system from Java™ programs or applications executed by the processor 110 in the computer 100. Instructions for the operating system, the object-oriented operating system, and applications or programs such as the present invention are located on storage devices, such as disk 180 or a network server, and may be loaded into main memory 130 for execution by processor 110. Map viewer 135 contains instructions to perform in accordance with the present invention as illustrated in the embodiment of FIG. 1. The instructions perform steps such as retrieving visible map objects having an assigned weight importance value, totaling the number of weighted importance values around a reference point, and determining the view perspective of a map containing the map objects depending on a predetermined threshold value. The processor 110 may typically run at 200 Mhz or greater.

Those of ordinary skill in the art will appreciate that the hardware in FIG. 1 may vary depending on the implementation. Other internal hardware or peripheral devices, such as flash ROM or equivalent nonvolatile memory, and the like, may be used in addition to or in place of the hardware depicted in FIG. 1. Also, the processes of the present invention may be applied to a multiprocessor data processing system. The depicted example in FIG. 1 and described examples below are not meant to imply architectural limitations of the present invention.

Figure 2:
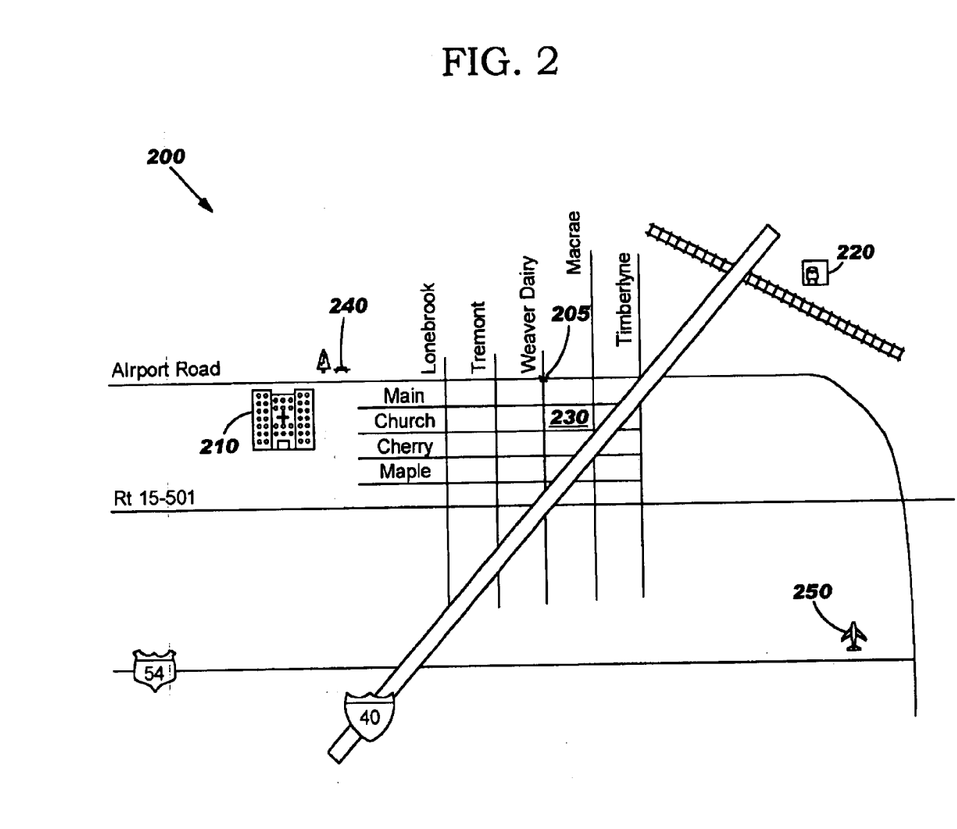
FIG. 2 is an exemplary geographical map illustrating a view perspective in accordance with the present invention.

FIG. 2 is an exemplary geographical map 200 illustrating a view perspective in accordance with the present invention. The geographical map 200 includes references to points of interest such as a hospital 210, a concentrated neighborhood 230, a park 240, a railroad station 220, and an airport 250. Before displaying the map 200, a user selected the corner of Weaver Dairy and Airport as a point of reference 205. In accordance with the present invention, each one of the labeled points of interest would be assigned a weighted importance value. By way of example, the hospital 210 may be assigned 50 value points, the park 240 may be assigned 15 value points, the concentrated neighborhood 230 may be assigned 40 value points, the airport 250 may be assigned 75 value points, and the railroad station 220 may be assigned 20 value points. A threshold value of 200 points would be preconfigured in the map viewer 135 or specified by the user. The threshold value represents the total amount of weighted importance value points that a user's capacity effectively processes. Therefore, before displaying the map 200 to the user, the map viewer 135, in this example, would sum up the points of interests surrounding a point of reference and grow the detail of the map until the sum equaled or exceeded the threshold value of 200 points. At this point, the expansion would stop.

Figure 3:
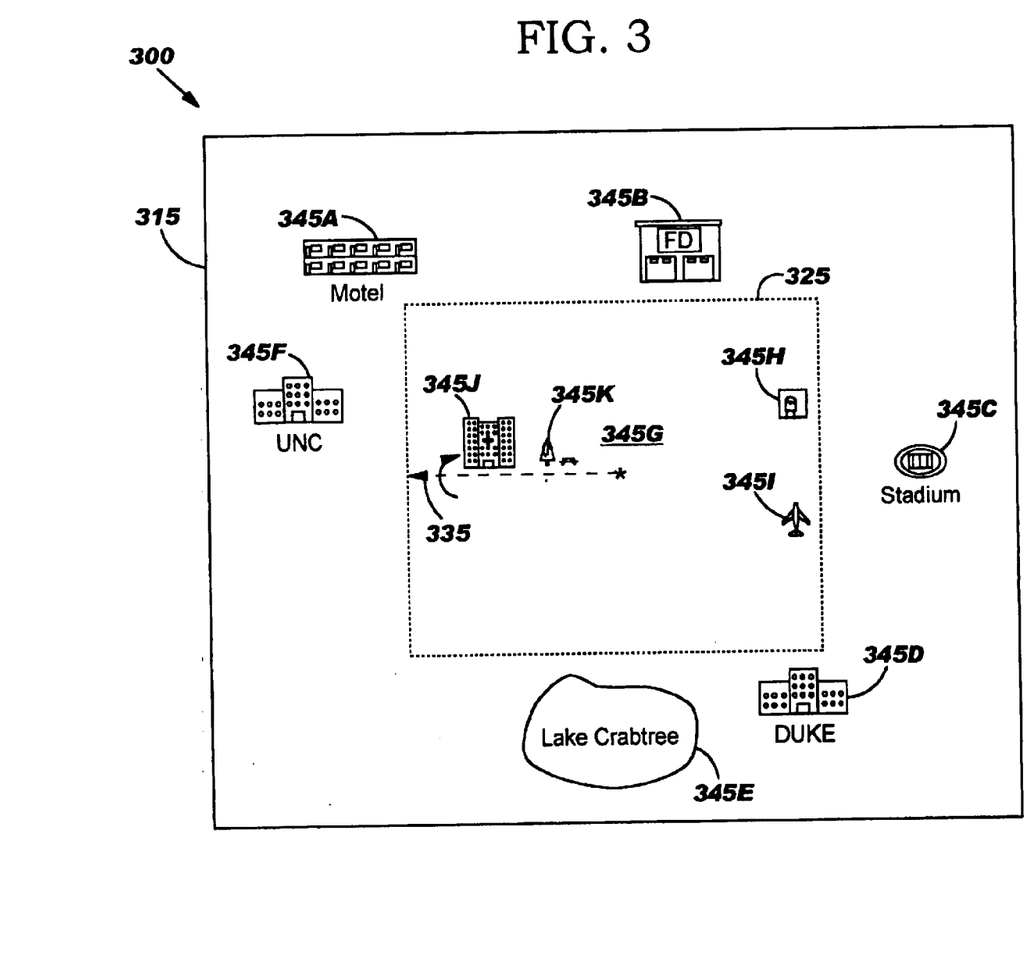
FIG. 3 is a representative internal view in accordance with the present invention for determining a perimeter of the view perspective such as the view shown in FIG. 2.

FIG. 3 is a representative internal view 300 in accordance with the present invention for determining a perimeter of a view perspective such as the view perspective shown in FIG. 2. The representative internal view 300 includes a viewable frame 315, view perspective perimeter 325, points of interest 345A–345K, and a scan line 335. The viewable frame 315 represents a logical boundary indicating all the potentially viewable points of interest surrounding a point of reference 305. View perspective perimeter 325 represents the border used when rendering a view perspective containing points of interest whose sum equals a target weight or threshold value as described above. The view perspective perimeter 325 may suitably include a North boundary, an East boundary, a South boundary, and a West boundary. However, other shapes may be used to de fine the view perspective perimeter 325. The scan an line 335 represents a logical directional line originating at the point of reference 305 and a current view perspective boundary for analyzing the viewable points of interest. The scan line 335 may rotate between each view perspective boundary in a round robin fashion to accumulate the weighted sum or density of each point of interest encompassed by each view perspective boundary.

In determining view perspective perimeter 325 of a map before its display, the number of weighted value points accrued in a particular direction is considered. Each view perspective boundary may progress outwardly by equal distal amounts resulting in a point of reference being located at the center of the map. Alternatively, each boundary may progress outwardly at varying distal amounts depending on the concentration of weighted value points accrued in the direction of each particular boundary. In the equal amount case, for example, the map viewer 135 may accumulate the weighted sum for each view perspective boundary by following a path represented by the scan line 335. As the scan line 335 logically rotates around point of reference 305 for one cycle to each view perspective boundary, viewable points of interest are recognized and their corresponding assigned weight is accumulated, and the accumulated weight is compared against a threshold value. As long as the accumulated weight is less than the threshold value, each boundary moves outwardly by an equal distal amount to % encompass more viewable points of interest to be analyzed. As shown in FIG. 3, the view perspective boundaries have grown to a size to include points of interest 345G–345K which according to their assigned weights as described FIG. 2 sum to equal the threshold value. Points of interest 345A–345F, although potentially viewable, have not been analyzed and thus have not been displayed in view perspective 200.

In the varying amount case, for example, the map viewer 135 may track weighted value points gathered while accumulating weighted values in the direction of each view perspective boundary. The map viewer 135 would then recognize if a larger number of weighted values are being accumulated while expanding the view perspective boundary in a certain direction. Upon this recognition, the map viewer 135 may favor looking for objects in the direction where the larger number of points are being accumulated by outwardly moving each view perspective boundary by a distal amount relative to the number of points accumulated in each view perspective boundary's direction. To this end, as the scan line logically rotates around point of reference 305 for one cycle to each view perspective boundary, viewable points of interest are recognized and their corresponding assigned weight is accumulated in the direction of each boundary and in total, and the total is compared against the threshold value. As long as the total of weighted points is less than the threshold value, each boundary moves outwardly by a distal amount relative to the weights accumulated in the direction of each boundary, before the next cycle of analysis.

In this varying amount case, the present invention advantageously predicts the interest of a user and displays more points of interest concentrated in a certain direction. As a side effect when the map is displayed the user's point of reference will be located in the opposite direction of the concentrated focus of weighted importance value points. For example, if the points of interest are concentrated in the southerly direction like in the case when a user approaches a vacation beach resort along the U.S.'s east coast line from the north, the point of reference would be displayed at the northern side of the map allowing more of the southerly points of interest to be displayed as compared to points of interest in the westward direction.

A user may select a point of reference as an input to the map viewer 135 or the point of reference may be gathered automatically through a global positioning system (GPS) device. Also, the user may select or a GPS device may be used to determine the direction in which the user is proceeding.

Figure 4:
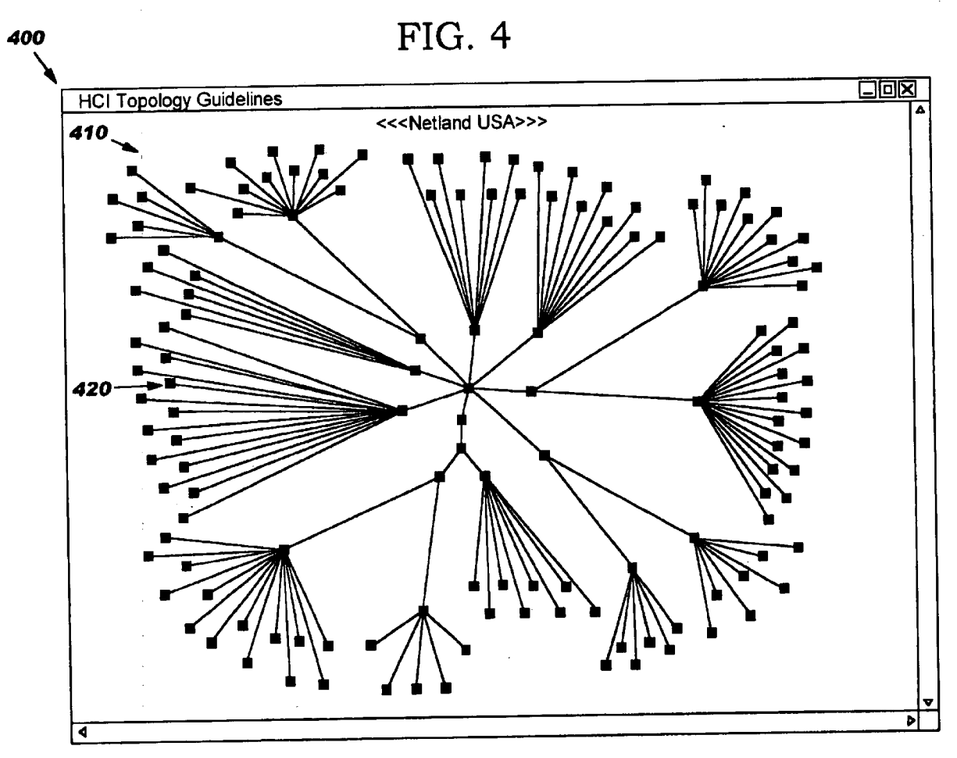
FIG. 4 is a topology viewer displaying an exemplary network topology of an entire network.
Figure 5:
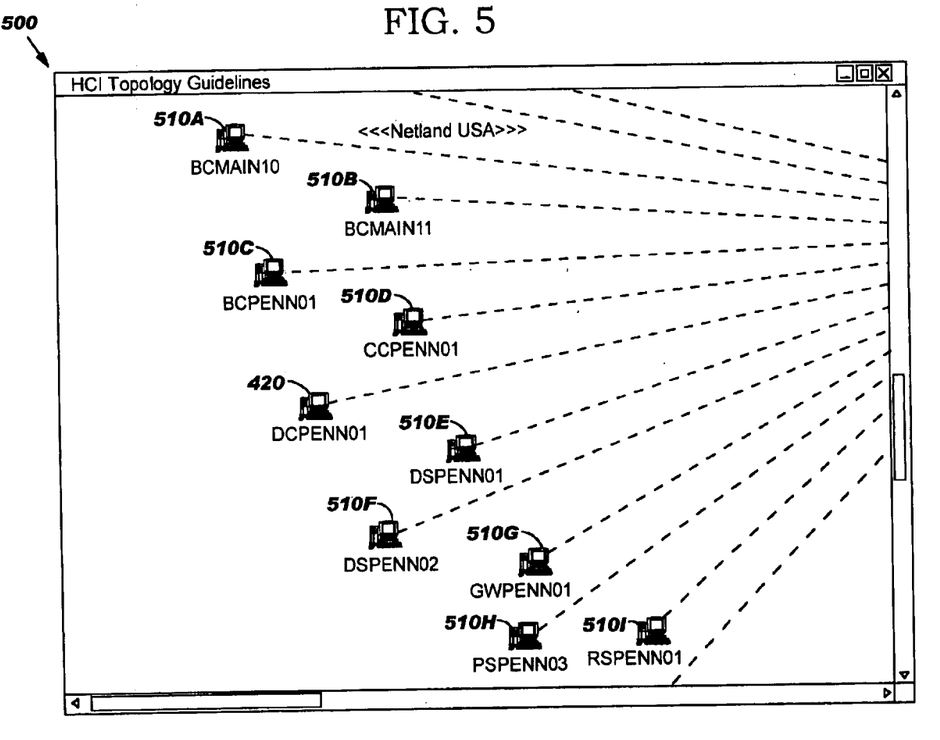
FIG. 5 is a view perspective of a portion of the network topology in accordance with the present invention.

FIG. 4 illustrates a topology viewer 400 displaying an exemplary network topology of an entire network 410. Computer 420 is a single node of many nodes in the entire network 410. Each node represents a computer system. Any particular computer system may take on the role of an end user computer, router, host, server, or the like. When utilizing the present invention, a user may select a computer as a point of reference and based upon the predetermined weighted threshold, a view perspective 505 shown in topology viewer 500 of FIG. 5 is displayed. For example, the user may be interested in computer 420 and the computers surrounding computer 420. To satisfy the user's interest, the user may point to computer 420 with the user's mouse cursor and click the mouse button. In response to the user's input, the present invention would display the view perspective 505 shown in FIG. 5.

The topology viewer 500 displays an automatically generated view perspective 505 of a portion of the network 410 once a user selects a point of reference. The view perspective 505 includes computers 510A–510I. While viewing view perspective 410, the user selected computer 420 as the user's point of reference when the user clicked computer 420 with the mouse. Further, the user may have selected or preconfigured a setting in the viewer 500 that there be no more than 10 nodes shown in this view. In this embodiment, the map viewer 135 provides the weighted threshold selection to be based on the number of points of interest to display since the objects have equal weights.

Figure 6:
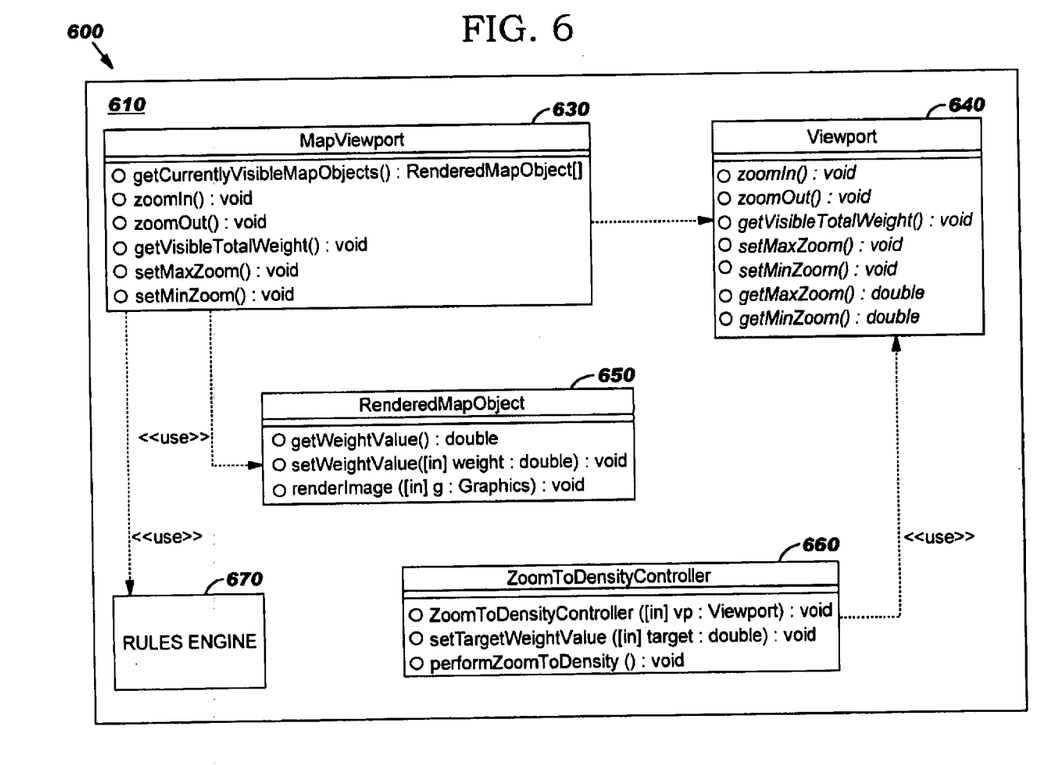
FIG. 6 is a block diagram illustrating the functional software components of a map viewer in accordance with a preferred embodiment of the present invention.

FIG. 6 is a block diagram of map viewer software 600 illustrating the functional software components 630, 640, 650, 660, and 670 of a map viewer 610 in accordance with a preferred embodiment of the present invention. The map viewer 610 includes MapViewport class 630 which implements a Viewport interface 640, RenderedMapObject class 650, ZoomToDensityController class 660, and optional rules engine 670.

The present invention may be simply integrated as a feature of an existing map viewer. For example, the present invention may be integrated with a standard map viewer such as MapQuest®, PARC® Map Viewer, and Spotlight™ on Active Directory® Topology Viewer™, or the like, by requiring the standard map viewer to implement the Viewport interface 640. The MapViewport class 630 is an example of a class which would be implemented in the standard map viewer as well. Standard map viewers already provide features such as zooming in, zooming out, setting the maximum zoom size, and setting the minimum zoom size resulting in minimum impact to a standard map viewer. In order to take advantage of the present invention, a standard map viewer would implement an additional method, getVisibleTotalWeight( ). This method calculates the combined weight of all the points of interest which are currently inside the visible rectangle of the viewport.

During operation, the MapViewport class 630 is instantiated by a processor, such as 110 of FIG. 1, as an object which contains a data model of all points of interest to be rendered. This data model may physically exist in a database or file and contain information concerning each point of interest such as its type and location. When the processor 110 instantiates the data model, the objects representing the points of interest of a renderable view are stored in memory 130. The RenderedMapObject class 650 provides additional information which is added to the data model. For example, each point of interest would be capable of having its weight value set or retrieved and its image rendered. Each one of the objects representing a point of interest would inherent from a RenderedMapObject class. Alternatively, the class that represents a point of interest may implement a RenderedMapObject interface. The map viewer 610 may optionally assign weights automatically among types of points of interest by a process of rules such as all major highways, airports, monuments, hospitals, and the like. To do so, the MapViewPort object 630 would request rules from rules engine 670 when setting the weighted values for points of interest stored in the data model. If, for example, the MapViewPort object 630 was assigning the weight of a point of interest such as an airport, the MapViewPort object would request the type of the point of interest and send the type retrieved from the point of interest in the request to the rules engine 670.

The ZoomToDensityController class 660 may be deployed as a plug-in feature to a standard map viewer or directly incorporated in the standard map viewer. When the ZoomToDensityController class 660 is instantiated by the processor 110, the ZoomToDensityController object utilizes an instance of a Viewport object to perform the zoom to density task of choosing the viewable points of interest to display depending on a predetermined threshold value. To do so, the ZoomToDensityController object asks the Viewport object for the total weight of the RenderedMapObjects that are currently visible but not yet displayed. The performZoomToDensity( ) method compares the total weight returned to a target weight value which has been previously set. If the total weight returned is greater than the target weight valued, the performZoomToDensity( ) method will instruct the Viewport object to zoom in to reduce the total weight returned. If the total weight returned is less than the target weight valued, the performZoomToDensity method will instruct the Viewport object to zoom out to increase the total weight returned. The zoom instructions stop when a minimum is reached, a maximum is reached, or the total weighted sum substantially matches the threshold.

It should be understood that although in the preferred embodiment of the invention the map viewer is implemented in software, in other embodiments of the invention all or portions of the instruction steps executed by this software may be resident in firmware or in other program media in connection with one or more computers, which are operative to communicate between the components of the map viewer. For purposes of the invention, all such forms of executable instructions shall be referred to as software.

Figure 7:
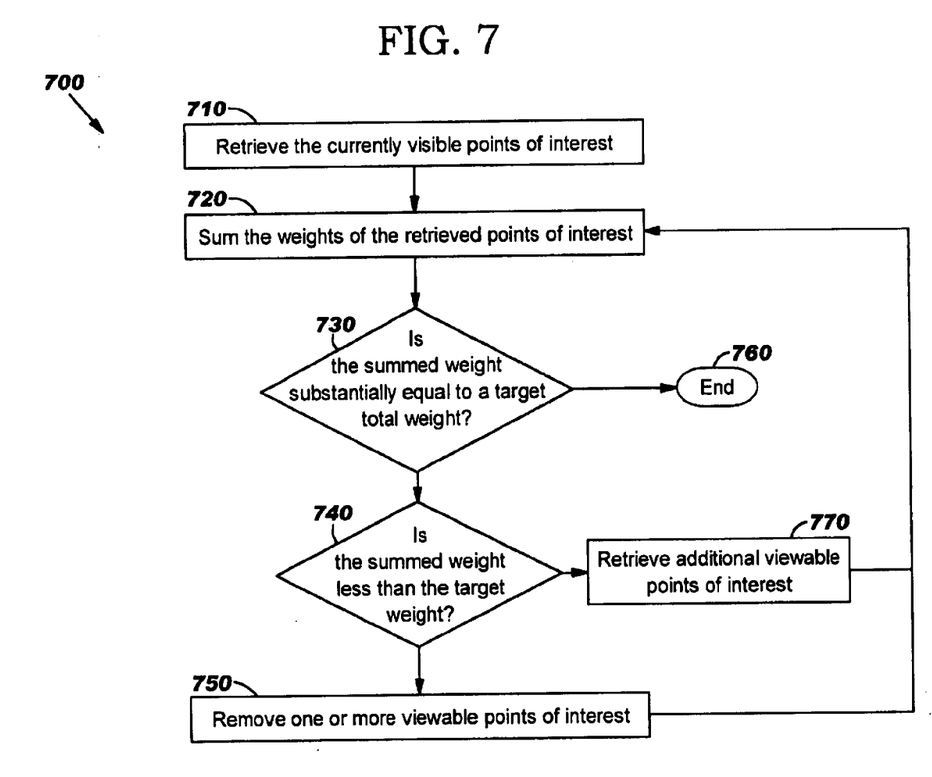
FIG. 7 is a flowchart illustrating a method of determining a zoom perspective level based on the density of weighting factors assigned to points of interest which are viewable by a user.

FIG. 7 is a flowchart illustrating a method 700 of determining a zoom perspective level based on the density of weighting factors assigned to points of interest which are viewable by a user. Before step 710, it is assumed that points of interest have individually been assigned a weight factor and that a target total weight has been set. At step 710, the points of interest which are viewable are retrieved. At step 720, the weights of each viewable point of interest are summed. At step 730, the summed weight is compared against the target weight. The method ends at step 760 if the summed weight is substantially equal to the target weight, a maximum threshold, or a minimum threshold. The maximum and minimum thresholds would typically be preconfigured by the map viewer and dependent on an area in which to display the results. At this point a set of viewable points of interest is found and may be passed on for display. Otherwise, the method 700 proceeds to step 740 where a determination is made whether the summed weight is greater than or less than the target weight.

If the summed weight is less than the target weight, the method 700 proceeds to step 770. At step 770, more viewable points of interest are retrieved. The method 700 then proceeds to step 720 to sum the additional points of interest to the previous total. If the summed weight is greater than the target weight, the method proceeds to step 750 where one or more points of interest are deleted from the set of viewable points of interest. The method then proceeds to step 720 to sum the weights of the retrieved points of interest. Those of ordinary skill in the art will appreciate that a target weight may vary depending on the implementation. Other targets, such as a range of target weights may be used in place of the specific target weight depicted in FIG. 7.

The description of the present invention has been presented for purposes of illustration and description, and is not intended to be exhaustive or as limiting the invention to the form disclosed. Many modifications and variations will be apparent to those of ordinary skill in the art. The embodiment was chosen and described in order to best explain the principles of the invention, their practical application, and to enable others of ordinary skill in the art to understand the invention. Subject to the limitations of the claims, various embodiments with various modifications as necessary to adapt the present invention to a particular environment or use are hereby contemplated, including without limitation the adaptation of various teachings herein in light of rapidly evolving hardware, software components and techniques for utilizing and adapting such items.

We claim:

1. A computer-readable medium whose contents cause a computer system to display a map having points of interest at a view perspective, the computer system having a map viewer with instructions to perform the steps of:

retrieving a set of one or more viewable points of interest, each point of interest having an assigned weight;

summing the weights of one or more viewable points of interest;

determining whether the summed weights of one or more viewable points of interest substantially equals a target weight; and displaying the set of one or more viewable points of interest if the summed weights of one or more viewable points of interest substantially equal the target weight.

2. The computer-readable medium of claim 1 further comprising the step of:

retrieving additional viewable points of interest if the summed weights of the set of one or more viewable points of interest is less than the target threshold.

3. The computer-readable medium of claim 1 further comprising a step of:

removing one or more viewable points of interest if the summed weights of the set of one or more viewable points of interest is greater than the target threshold.

4. The computer-readable medium of claim 1 wherein the target weight is specified by a user.

5. The computer-readable medium of claim 1 wherein the retrieved set of one or more viewable points of interest are chosen about a point of reference.

6. The computer-readable medium of claim 5 wherein the summing step further comprises:

tracking a first sum of weights of one or more viewable points of interest accrued in a first direction of a boundary from the point of reference, the boundary encompassing one or more viewable points of interest.

7. The computer-readable medium of claim 6 wherein the retrieving step further comprises:

encompassing additional viewable points of interest by outwardly expanding the boundary in the first direction from the point of reference at a first distal amount.

8. The computer-readable medium of claim 7 wherein the retrieving step further comprises:

encompassing additional viewable points of interest by outwardly expanding the boundary in a second direction from the point of reference at a second distal amount and wherein the first distal amount is unequal to a second distal amount.

9. A computer system for displaying a map having points of interest at a view perspective, the computer system comprising:

a memory containing:

a map viewer computer program having a first method of invocation to retrieve the total weight of viewable points of interest, the map viewer computer program retrieving one or more viewable points of interest, each viewable point of interest having an assigned weight;

a zoom to density computer program for invoking the first method to determine whether the total weight of viewable points of interest substantially equals a target weight, the map viewer displaying the viewable points of interest if the total weight of viewable points of interest substantially equals a target weight; and a processor for running the map viewer computer program and the zoom to density computer program.

10. The computer of claim 9 wherein the map viewer computer program further comprises retrieving additional viewable points of interest if the summed weights of one or more viewable points of interest is less than the target threshold.

11. The computer of claim 9 wherein the map viewer computer program further comprises removing one or more viewable points of interest if the summed weights of one or more viewable points of interest is greater than the target threshold.

12. The computer of claim 9 wherein the target weight is specified by a user.

13. The computer of claim 9 wherein the retrieved viewable points of interest are chosen about a point of reference.

14. The computer of claim 13 wherein the map viewer program further comprises tracking a first sum of weights of one or more viewable points of interest accrued in a first direction of a boundary from the point of reference, the boundary encompassing one or more viewable points of interest.

15. The computer of claim 14 wherein the map viewer computer program further comprises encompassing additional viewable points of interest by outwardly expanding the boundary in the first direction from the point of reference at a first distal amount.

16. The computer of claim 15 wherein the map viewer computer program further comprises encompassing additional viewable points of interest by outwardly expanding the boundary in a second direction from the point of reference at a second distal amount and wherein the first distal amount is unequal to a second distal amount.

17. A method for displaying a map having points of interest at a view perspective, the method comprising:

retrieving a set of one or more viewable points of interest, each point of interest having an assigned weight;

summing the weights of one or more viewable points of interest;

determining whether the summed weights of one or more viewable points of interest substantially equals a target weight; and displaying the set of one or more viewable points of interest if the summed weights of one or more viewable points of interest substantially equal the target weight.

18. The method of claim 17 further comprising:

retrieving additional viewable points of interest if the summed weights of the set of one or more viewable points of interest is less than the target threshold.

19. The method of claim 17 further comprising:

removing one or more viewable points of interest if the summed weights of the set of one or more viewable points of interest is greater than the target threshold.

20. The method of claim 17 wherein the target weight is specified by a user.

21. The method of claim 17 wherein the retrieved set of one or more viewable points of interest are chosen about a point of reference.

22. The method of claim 21 wherein the summing step further comprises:

tracking a first sum of weights of one or more viewable points of interest accrued in a first direction of a boundary from the point of reference, the boundary encompassing one or more viewable points of interest.

23. The method of claim 22 wherein the retrieving step further comprises:

encompassing additional viewable points of interest by outwardly expanding the boundary in the first direction from the point of reference at a first distal amount.

24. The method of claim 23 wherein the retrieving step further comprises:

encompassing additional viewable points of interest by outwardly expanding the boundary in a second direction from the point of reference at a first and second amount and wherein the first distal amount is unequal to a second distal amount defined by the amount of outwardly expanding the boundary in a second direction from the point of reference.

* * * * *